US009200554B2

(12) United States Patent
Cook

(10) Patent No.: US 9,200,554 B2
(45) Date of Patent: Dec. 1, 2015

(54) HYBRID SYSTEMS FOR LOCOMOTIVES

(71) Applicant: David Cook, Fullerton, CA (US)

(72) Inventor: David Cook, Fullerton, CA (US)

(73) Assignee: Clean Train Propulsion, Fullerton, CA (US)

( * ) Notice: Subject to any disclaimer, the term of this patent is extended or adjusted under 35 U.S.C. 154(b) by 0 days.

(21) Appl. No.: 14/217,082

(22) Filed: Mar. 17, 2014

(65) Prior Publication Data

US 2014/0261059 A1 Sep. 18, 2014

Related U.S. Application Data

(60) Provisional application No. 61/790,771, filed on Mar. 15, 2013.

(51) Int. Cl.
| | |
|---|---|
| *B61C 3/02* | (2006.01) |
| *F01N 3/20* | (2006.01) |
| *B61C 17/02* | (2006.01) |
| *B61D 15/06* | (2006.01) |
| *F01N 3/10* | (2006.01) |
| *F01N 13/08* | (2010.01) |
| *F01N 13/10* | (2010.01) |
| *F01N 13/18* | (2010.01) |
| *F01N 13/00* | (2010.01) |

(52) U.S. Cl.
CPC ... *F01N 3/20* (2013.01); *B61C 3/02* (2013.01); *B61C 17/02* (2013.01); *B61D 15/06* (2013.01); *F01N 3/103* (2013.01); *F01N 3/2066* (2013.01); *F01N 13/0093* (2014.06); *F01N 13/085* (2013.01); *F01N 13/10* (2013.01); *F01N 13/1816* (2013.01); *F01N 2340/02* (2013.01); *F01N 2340/06* (2013.01); *Y02T 10/24* (2013.01); *Y02T 30/12* (2013.01)

(58) Field of Classification Search
CPC . H01M 2/1077; H01M 2/206; H01M 10/482; H01M 2/1016; B61C 3/02; Y02T 30/12
USPC ................................ 105/50, 51; 419/99, 100
See application file for complete search history.

(56) References Cited

U.S. PATENT DOCUMENTS

| | | | |
|---|---|---|---|
| 2010/0275810 A1* | 11/2010 | Barbee et al. | 105/50 |
| 2012/0263989 A1* | 10/2012 | Byun et al. | 429/99 |

* cited by examiner

*Primary Examiner* — Mark Le
(74) *Attorney, Agent, or Firm* — Richards Patent Law P.C.

(57) ABSTRACT

A modular locomotive UC storage system includes: at least one cabinet section in a locomotive; a plurality of vertical stacks of UC modules housed within each cabinet section, each UC module including a plurality of UC cells; wherein each UC module within each of the vertical stacks of UC modules is connected in parallel to the UC modules within the vertical stack; wherein each of the vertical stacks of UC modules are connected in series with the other vertical stacks of UC modules within each cabinet section; wherein the connections between the UC modules and between the vertical stacks of UC modules are made by bus bars located such that the UC modules electrically connect with the bus bars in an appropriate combination of series and parallel connections when the UC modules are located in position within the cabinet sections.

21 Claims, 7 Drawing Sheets

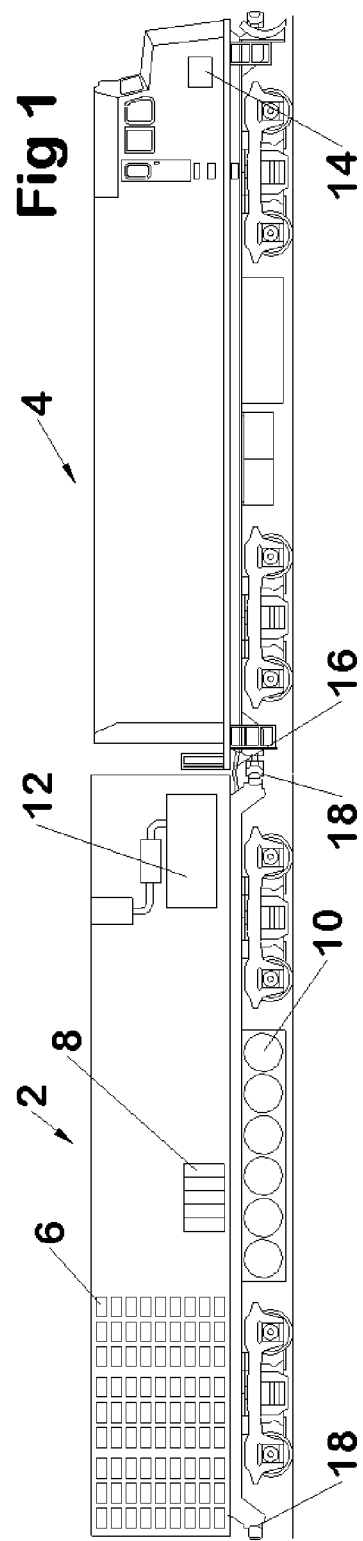

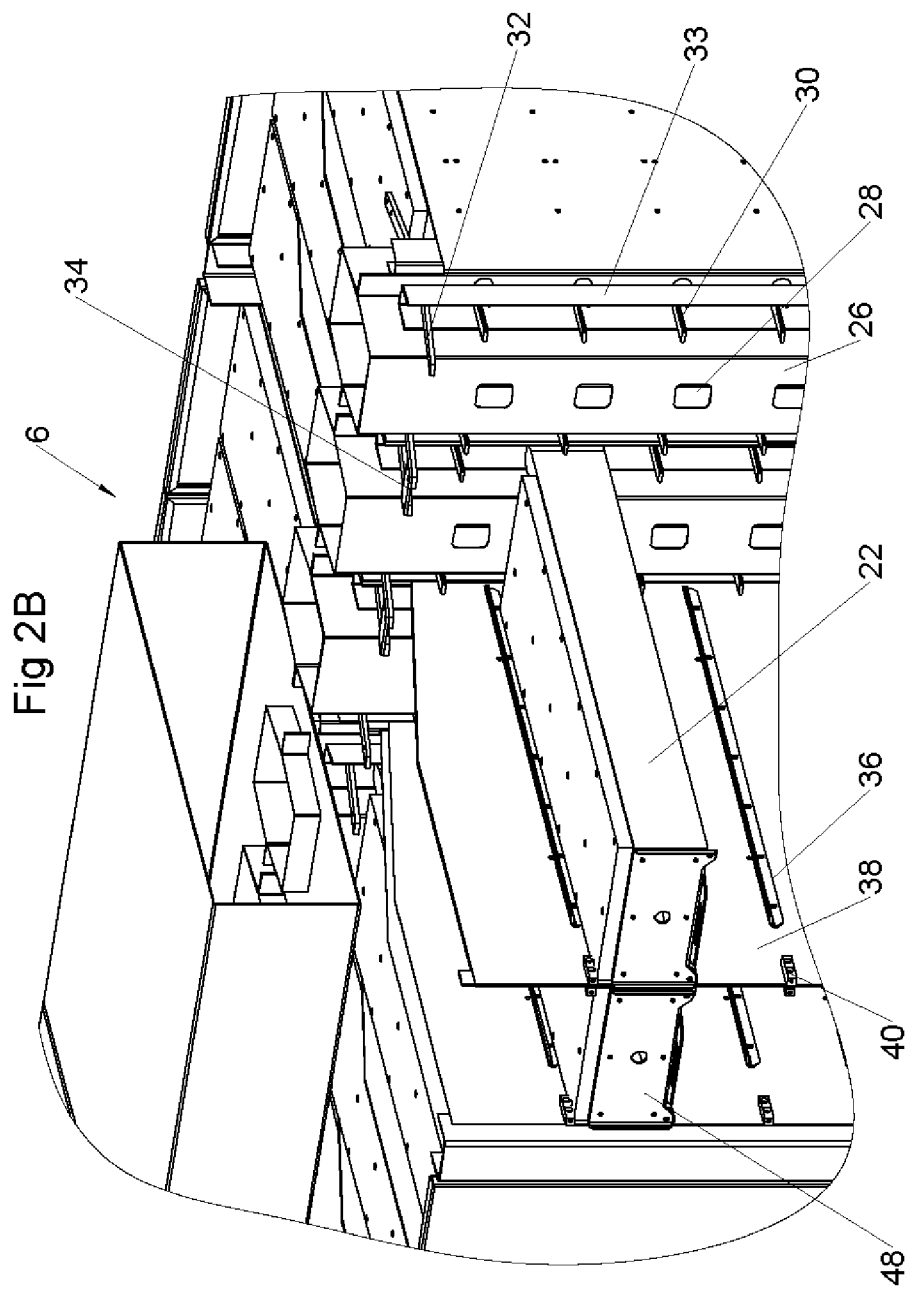

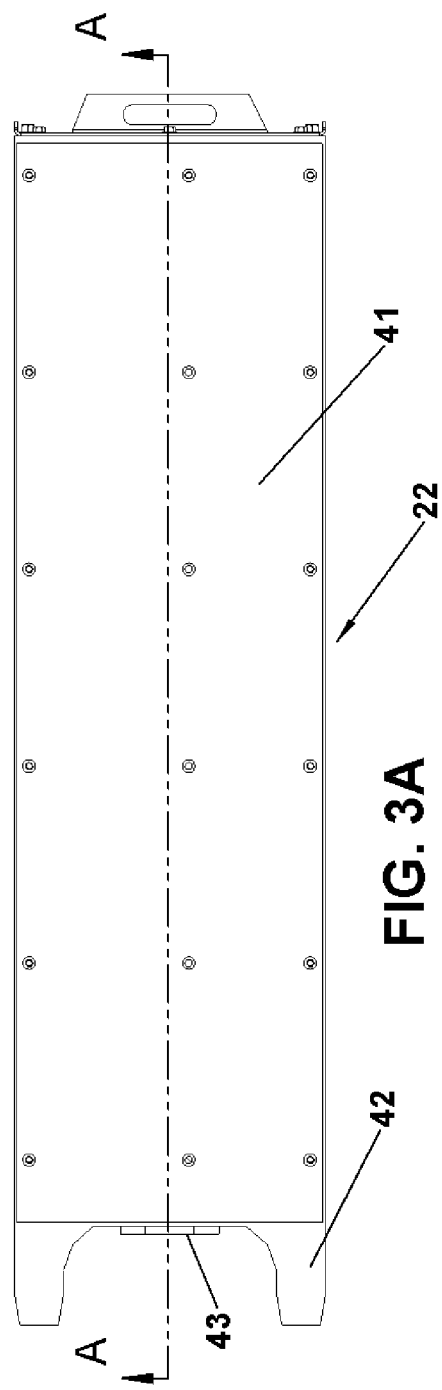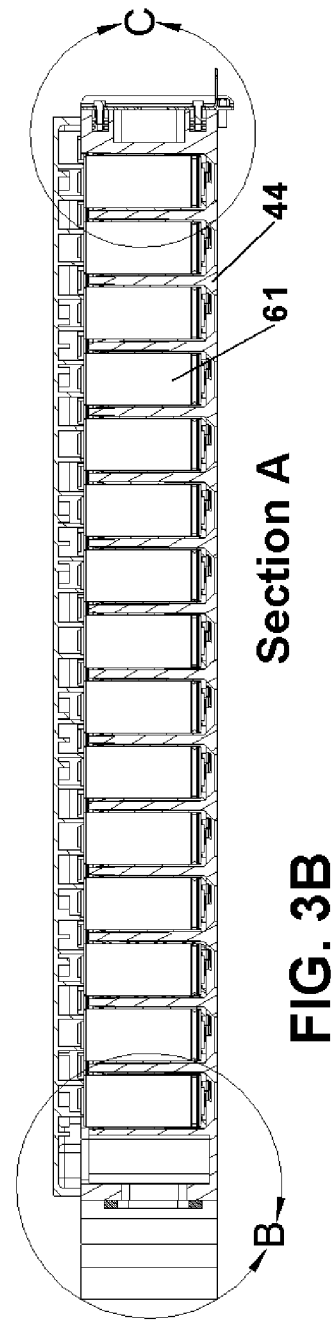
FIG. 3A
FIG. 3B

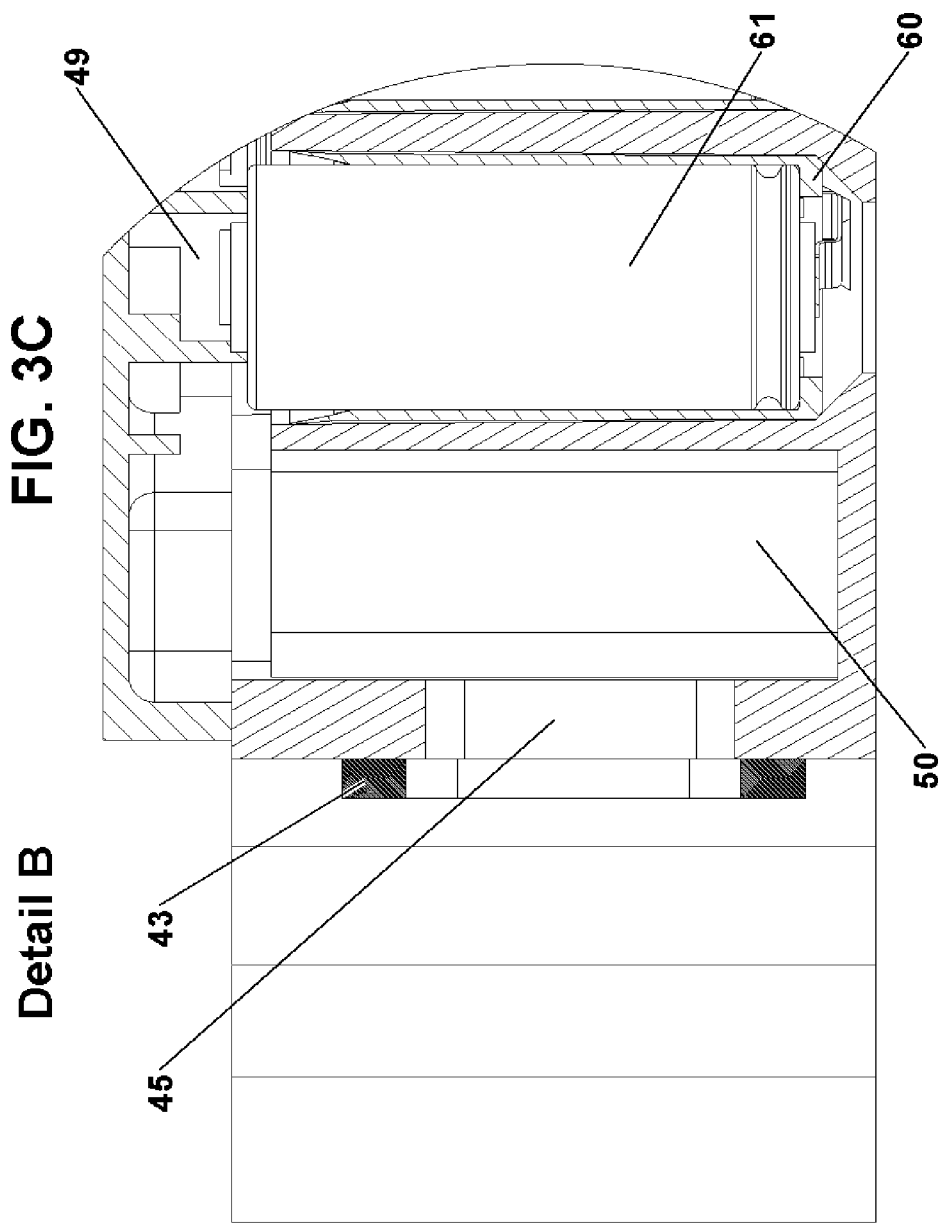

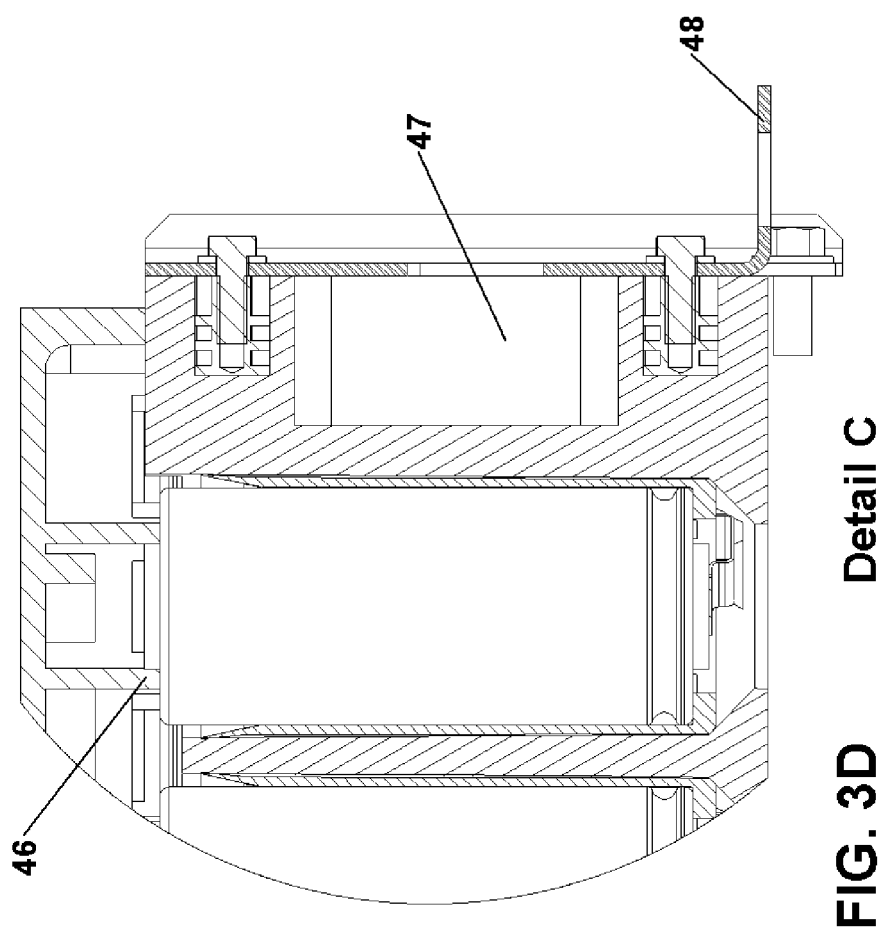
FIG. 3D    Detail C

Detail B

HYBRID SYSTEMS FOR LOCOMOTIVES

CROSS-REFERENCE TO RELATED APPLICATIONS

This application claims the benefit of U.S. Provisional Application No. 61/790,771 filed on Mar. 15, 2013, the entirety of which is incorporated herein by reference.

BACKGROUND OF THE INVENTION

The most common current use of ultra-capacitor cells for hybrid energy storage systems (HESS) is in transit busses. These system are offered as modular systems with a typical bus having one ½ kW-hr storage module. Bluways in Europe offers a 700 Volt ½ kW-hr module for $45,000, which is a cost per kW-hr of $90,000. A city bus weighs approximately 15 tons and will typically be stopping from 40 mph or less. On the other hand a typical commuter train with 6 bi-level coach cars will weigh 600 tons and should be stopping from 79 mph. The train has 160 times more kinetic energy. Calculations indicate this train will require 80 kW-hr's of ultra-capacitors to capture that energy and at $90,000/kW-hr that would cost $7.2 million which is more than the $6.3 million that a new Tier 4 diesel passenger locomotive costs. Existing UCESS modules for transit buses would not package well on a rail tender car and would also not stand up well to the more constant steel wheel on steel rail vibration over the 20 year locomotive service life.

The commuter rail application has several unique characteristics that make it an excellent opportunity to utilize the benefits of a HESS. Unlike typical on road applications such as diesel trucks, a diesel electric locomotive already has the electrical machinery to capture the braking energy. With the reduced rolling friction of steel wheels on steel rails, the impact of the additional weight of a HESS is minor compared to that of a rubber tired on-road vehicle. This overcomes the battery advantage over ultra-capacitors of higher energy density.

Switcher locomotives are another application where hybridization would be beneficial due to the frequent start and stopping action of the locomotive as it moves small strings of cars back and forth to build up or take apart longer trains.

What is desired is a novel packaging and control system for ultra-capacitor systems that decreases the per kW-hr cost while adding system redundancy and reliability. This system should be backwards compatible as much as possible with existing locomotives and locomotive control systems. It should also be able to incorporate both ultra capacitor cells and battery cells in a modular system with adequate provisions to insure safe operation

BRIEF SUMMARY OF THE INVENTION

When there is a transition to hybridization the passenger rail industry, there will be an effort to make new systems backwards compatible and integrate these new more powerful systems in such a way that they can be used in trains that still use conventional locomotives or conventional locomotives with minimal modifications.

Because of the frequent start and stop nature of commuter passenger trains, it is likely that these will be the first rail application that is hybridized as the technology of power electronics and electric energy storage matures. Hybridization using both batteries and UC cells is currently expanding in hybrid transit bus fleets. In the rail application, large enough HESS will require more space than is available on current locomotives, so it is likely these systems will place the HESS in an additional rail vehicle. The future Hybrid locomotive systems are likely to utilize a functional pair of locomotives. The controlling locomotive will be an A unit locomotive with an operators compartment and fossil fueled engines that provide the energy consumed during the time the locomotive is in service. Attached to the A unit will be a B unit locomotive that will house the HESS. This B unit will also have its own set of powered traction motors for accelerating and decelerating the train. When fully refined it is likely that there will be a common DC bus between the A unit and the B unit that allows the traction motors from both rail vehicles to be used both to decelerate and accelerate the train by moving energy in and out of the B unit HESS.

Implementation of this common DC bus would require major modifications of the A unit locomotives and so it is likely that early versions of hybrid locomotives would have only the B unit traction motors to charge the energy storage system during deceleration and then use that energy only in the B unit traction motors help accelerate the train. By delaying the full conversion of the hybrid locomotive pair to use a common DC bus, a commuter railroad could use its entire fleet of existing locomotives with newly acquired hybrid B units. These existing locomotives would require only minimal modifications to operate as A units with a growing fleet of B units. Because the commuter agencies can utilize existing locomotives they already own, it will make acquiring B units more affordable and accelerate the B unit fleet growth and the transition to full fleets of hybrid commuter trains. At the point there is an almost full fleet of B units, the A unit locomotives can then be upgraded to common DC bus power electronics at its next major maintenance or overhaul period. The B units will need only superficial updates to operate with A units equipped with common DC bus power electronics.

The B units may store additional fuel as well, thereby allowing the railroad to convert to an alternative fuel without diminishing the range of the train. In some cases the fuel use reduction of hybridization along with the additional fuel carried on the B unit will actually extend the operating range of a train.

Additionally the B unit may be equipped with Crash Energy Management (CEM) features such as pushback couplings which may extend the operational service life of older locomotives as the B unit could have additional CEM capability to offset the lack of a pushback couplings or other CEM features on the A unit locomotive.

The B unit may have provisions for its own HEP generator and fuel supply. Adding the HEP generator allows the B unit to take over some functions that were previously performed on the A unit such as transferring waste heat to the atmosphere remotely from the fossil fuel engines on the A unit. In another embodiment, the brake compressor can be moved from the A unit to the B unit to free up additional space in the A unit for a bigger HEP, auxiliary generator or a waste heat recovery system.

A hybrid control interface box (HCIB) will be disclosed that allows a Hybrid B unit to be coupled to a standard locomotive. The only modification needed to the standard locomotive to be used as an A unit would be the installation of the HCIB. Because hybridization can be done with such a minor modification to existing equipment, it may accelerate the transition of all commuter fleets.

Several techniques of modifying existing locomotive control systems will be disclosed allowing control of hybrid locomotive systems for both passenger rail and switcher service. These include features of constant acceleration and deceleration control for simplified engineer control of regenerative braking and boosted acceleration. Optionally there are configuration modification control features to delay using the stored energy in a hybrid switcher system or accelerate the use of stored hybrid energy in passenger locomotives on shorter stop segments.

In addition to the HCIB, proposed will be a simple and clear indicating system for the engineer that allows optimizing of the regenerative energy capture under different track conditions and train weight.

A modular HESS will be disclosed with several novel packaging concepts combined with a novel electrical bussing and control system to both drive down the module and module rack system cost while offering a robust and redundant system applicable to railroad service.

Also to be disclosed is a simple, low cost forced air cooling system for the HESS.

Each UC cell can have its own supply of cooling air to minimize cell temperatures and maximize the system voltage for the highest energy density and UC cell durability.

An optional spiral groove is placed around each cell to insure evenly distributed cooling air flow between all cells on the same duct system and better utilization of each mass unit of cooling air.

The increased cooling air utilization allows smaller ducting and corresponding higher number of UC cells in each UC cell module.

Intermediate bus bars are used to allow parallel and series interconnect of modules with any one module failure not affecting other modules in its series string.

Optionally, each UC cell module assembly could contain UC cells, a DC contactor plus the cell balancing electronics and a module controller.

Each UC module can be removable with a minimal amount of fasteners and only low voltage circular connector.

Hybridization of trains will have several benefits. The additional power of the hybrid B unit will accelerate current length trains more quickly or allow longer trains to accelerate at the same rate without the need for a bigger diesel engine in the locomotive. The hybrid B unit will also reduce overall fuel consumption, criteria emissions and GHG emissions. In advanced systems it will actually encourage the installation of smaller more efficient engines without sacrificing performance.

Further the hybrid B unit will reduce the amount of brake disc and pad wear on the air braking systems for the rail passenger cars which will reduce cost in materials and maintenance.

Hybridization will also improve the commuter rail service by encouraging the railroad to stop more often at shorter distances without paying a penalty in increase fuel usage or significant travel delay. As commuter rail agencies build up, they tend to add more stops between existing stops, this technology reduces both the schedule and fuel penalty of these additional stops. Because this technology lowers fuel operating cost while increasing performance, it may become a disruptive technology accelerating the growth of existing commuter agencies by simultaneously allowing lower fares and higher service frequency.

Utilizing the additional space allowed by the B unit is an advanced locomotive configuration that uses ram air cooling, waste heat recovery and water injection to further reduce the greenhouse gases and increase the performance of trains equipped with these locomotive systems.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1: F40 Passenger Locomotive with hybrid B unit including optional HEP generator and CNG tanks installed on B unit FIG. 2B: A cut away view of part of the HESS from FIG. 2A with many parts removed for clarity FIG. 3A: A top view of a single UC cell module assy.

FIG. 3B: A side cross section view of FIG. 3A showing some internal details of the UC cell module assembly.

FIG. 3C: Detail View B from FIG. 3B with a close up view of the rear section of a UC cell module assembly where the UC module assembly connects to the electric bus bars and vertical cooling air duct.

FIG. 3D: Detail View C from FIG. 3B with a close up view of the front section of a UC cell module assembly where the UC module is retained in the racking system and the low voltage control module and communications plug is connected.

DETAILED DESCRIPTION OF THE INVENTION

Figure 2A:
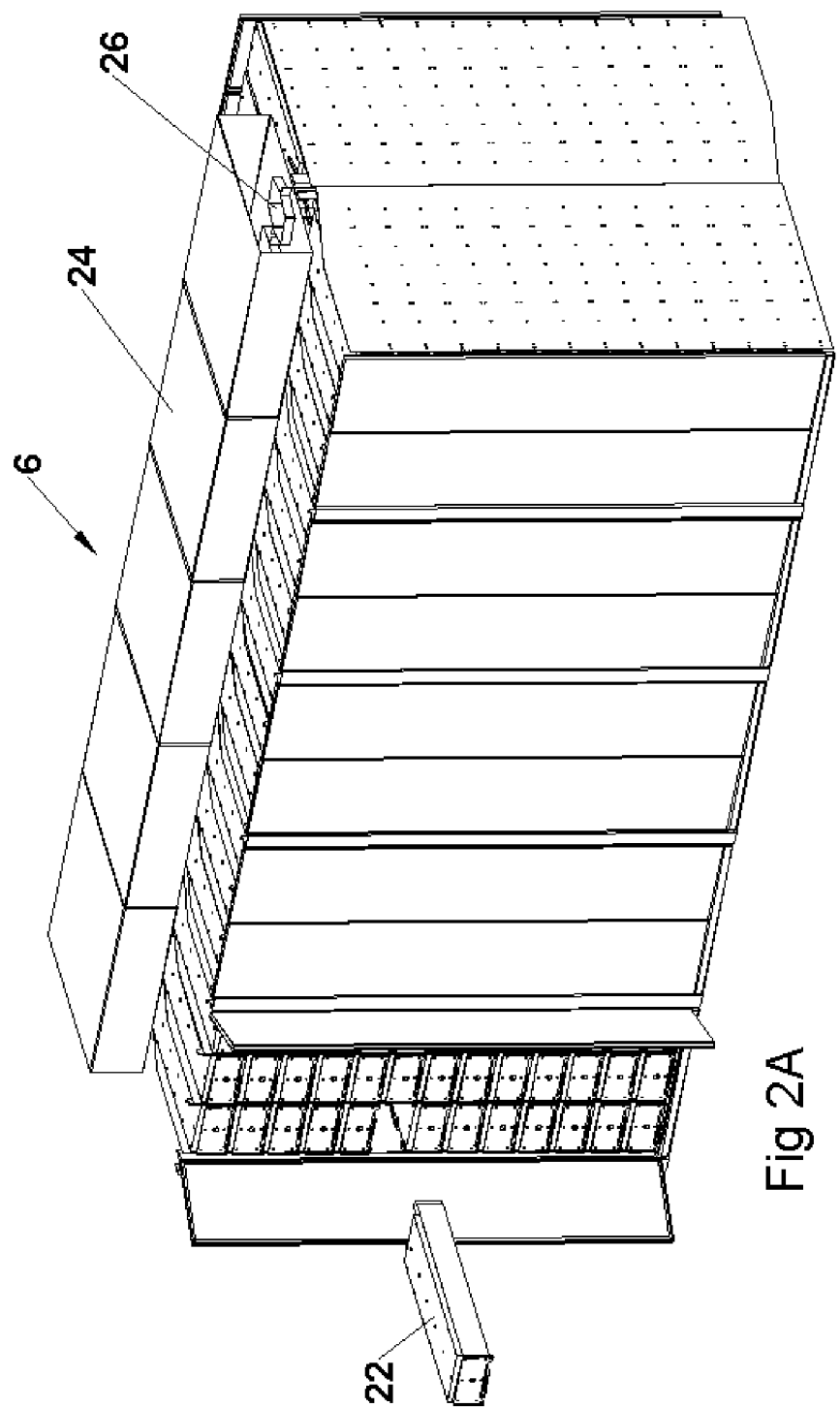
FIG. 2A: An Isometric view illustrating 6 cabinet sections of a HESS system with integral cooling on a B unit with optional HEP generator and CNG storage

To facilitate an understanding of the present disclosure, a number of terms and phrases are defined below:

Auxiliary Power Unit (APU): When a passenger locomotive system is converted to a hybridized system, what was the HEP generator can now be called an Auxiliary Power Unit. This APU will typically be ½ the size of the larger locomotive engine, potentially 500 to 900 kW in size. When the locomotive is in service this engine will at a moderate load continuously with the larger locomotive engine only be turned on or loaded for acceleration events. This name change is due to the functional difference between a HEP generator and the APU. A typical HEP generator only supplies hotel power to the passenger cars. In a hybrid passenger train the APU can supply power to not only the passenger cars, but also to the traction motors and the hybrid energy storage system. The hotel power is generated by a static inverter that is powered off of a common DC power bus. This common DC power bus electrically connects the hybrid energy storage system, the large locomotive engine and the APU which are the three possible power sources on the locomotive. The traction motors also get there power from the common DC power bus so that any one or more of the three power sources can be the supply of propulsion or hotel power. Further the hybrid energy storage system can be charged by any one or more of the traction motors, large locomotive engine or the APU.

'B' Unit: During the transition from steam power to diesel power in the railroad industry, the early diesel locomotives engines were much less powerful, efficient and reliable than current medium speed diesel engines. Because of this, it was rare to have a single diesel powered locomotive in a consist. It was so common to have additional locomotives in train consists that many locomotives were produced without an operators cab. These locomotives were called 'B' units, and the locomotives they were connected to would be referred to as an A unit. In conventional practice an A unit could be capable of independent operation without an attending 'B' unit, or some A units could be specially designed to be dependent on a supporting 'B' unit. In this document a 'B' unit refers to a rail vehicle that has its own traction motors, power source, energy storage, but not an operators cab. As disclosed a typical 'B' unit will contain a hybrid energy storage system and may optionally contain additional fuel storage for its own use or it may supply fuel to the A unit. This optional stored fuel could be any gaseous or liquid fuel. It could be some kind of solid fuel system designed as a hydrogen carrier.

Head End Power (HEP): passenger locomotives need hotel power for the passenger car climate control and lights. This is typically provided by a second diesel generator on a locomotive that outputs 480 volts AC at 60 Hertz in the united states, in Canada and Europe HEP power may be provided at a different voltage and frequency. In some locomotives a second engine is not used, and the hotel power is generated by the prime engine which propels the locomotive. This can be done by using a second generator attached to the main engine, or with a static inverter that takes electrical power from the traction alternator or generator and converts that to the appropriate voltage and frequency for hotel power. In this document hotel power will commonly be referred to as HEP Locomotive Fuel Optimizer (LFO): Is a device manufactured by Quantum, now Invensys for manipulating throttle controls in consists of multiple locomotives. All locomotives in a consist share the throttle signal from the lead locomotive across a locomotive to locomotive control signal trainline called an MU cable. The LFO is installed in each locomotive and intercepts the throttle control signal on the MU trainline cable before it goes to the engine control in each locomotive. Without an LFO system all the locomotives would be at the same throttle position that the engineer commands in the lead locomotive. An LFO system is implemented to run the locomotives with the highest fuel efficiency at the highest power setting while the lower efficiency units operate at reduced power or idle. With an LFO system, when the engineer selects a throttle position less than notch 8 (full throttle), the LFO will perform calculations and determine which engines should remain at high power and which should be throttle back. At all times the combined power output of the locomotives will be close to what the engineer requested with the throttle lever, but the LFO system manipulates the individual throttles to save fuel by operating the most efficient engines at the highest power setting. When an LFO is not active, the locomotive will respond to throttle inputs as if the LFO was not installed.

UC Cells: Ultra capacitor systems are usually built up from individual cells joined in series for higher voltage capacity and also joined in parallel for higher current capacity. In this document, when a UC cell is discussed, it could also be replaced with a similar battery cell.

The first portion of the detailed description relates to a 'B' unit. FIG. 1 is a side view of a passenger locomotive, A unit 4 with a B unit 2 connected. Installed on B unit 2 is a hybrid energy storage system HESS 6 composed of multiple UC Cell modules in a rack assembly. B unit 2 also has a set of power electronics 8 that will control the flow of energy between HESS 6 and the traction motors in B unit 2. A unit 4 could be any conventional passenger locomotive except that it has a Hybrid Control Interface Box, HCIB 14 installed. In one embodiment HCIB 14 will intercept the engineers throttle and dynamic brake control inputs and then calculate a new throttle and dynamic brake setting for A unit 4 while also communicating to power electronics 8 the appropriate signals so that the train produces the requested tractive power output commanded by the engineer.

The B unit 2 is also equipped with three optional features. First is an optional Head End Power generator, HEP 12. HEP 12 may serve several functions. In fleets that use older F40PH locomotives, it was common to not have an independent HEP generator on these units. These particular locomotives were known in the industry as 'Screamers' because the main locomotive engine had to operate at maximum RPM any time that the HEP generator system was providing hotel power to the coaches. This would mean the locomotive would come to a complete stop at the station yet the engine would still be at full RPM. This not only made excessive noise at the station platform where people were standing, but the engines were very inefficient at this high RPM and low load. It also reduced the continuous propulsion power that the locomotive could put out because some of the engines output had to be used to provide hotel power. In this case, the addition of HEP 12 to B unit 2 solves several problems; its quieter, more efficient, less polluting and the locomotive is now capable of more continuous propulsion power. This is even if HEP 12 is supplied with diesel fuel from either A unit 4 or a diesel tank installed on B unit 2.

The second optional feature added to B unit 2 is the set of CNG Tanks 10. In this case, even a diesel fueled A unit locomotive could be partially converted to CNG by using CNG fuel to power the HEP 12. In some cases a commuter locomotive may consume ⅓ of its fuel producing hotel power to heat, cool and vent the passenger coaches. As these trains are hybridized, the proportion of energy used for HEP power will increase as hybridization reduces the amount of energy used for propulsion. On very short segments, the energy needed for locomotive propulsion can be reduced by 40%. Because CNG storage requires at least 6 times the storage volume as diesel fuel it is impractical to convert commuter locomotives to CNG fuel. It is the combination of reduced fuel consumption due to hybridization and the addition of this extra fuel storage space under B unit 2 that makes conversion of commuter rail to CNG fuel now practical without requiring multiple refueling events every day.

The third optional feature added to B unit 2 are Crash Energy Management features. In FIG. 1 these are shown as pushback couplings CEM 18 installed at each end of B unit 2. It is currently impractical to modify a standard locomotive frame to accept pushback couplings and these are currently only designed into new locomotives. Having this feature may allow the commuter railroads to safely keep their older F40 and F59 passenger locomotives in service for several more decades by adding extra energy absorption to the B unit to make up for the lack of CEM energy absorption in the A unit locomotive it may be connected to. Voith now offers a 23 inch stroke pushback coupling system in addition to a 19 inch stroke anti climber system that could be integrated into each end of B unit 2. This would be equivalent to over four times the Crash Energy Management (CEM) energy absorption of the Metrolink Hyundai Rotem passenger cars which are the safest in North America as of 2012. With the CEM integrated into the B unit, it reduces the concern of the heavy locomotive without CEM pushing a train because the B unit itself may have more total CEM energy absorption than required for a combined A and B unit when both are equipped to meet modern CEM standards. These pushback couplings and anti-climbers can be installed for CEM in all of the B unit designs in this document. There are over 700 passenger locomotives in the US that don't have CEM protection, and this B unit upgrade when hybridizing is an economical and practical way to upgrade older locomotives to meet current CEM standards while also improving train performance. It is illustrated and described in FIG. 1 that the CEM 18 feature is provided by pushback couplings, it is known in the art that CEM capability can be added by pushback couplers, pushback anti-climbers and also deformable structures at each end of the B unit 2 frame and body.

FIG. 1 also has a set of cables 16 that couple the A unit 4 to B unit 2 to transfer power. Cables 16 on a conventional passenger locomotive would contain a set of cables that would transfer hotel power from the locomotive to the passenger coaches in the train, these are typically referred to as HEP cables. In an alternate embodiment, Cables 16 could also be used to transfer excess dynamic braking energy from F40PH4 to B unit 2.

In an advanced embodiment, cables 16 would become the link between the common DC buses on both the B unit 2 and A unit 4. In this advanced embodiment it is possible to transfer regenerative braking energy from the A unit 4 traction motors through the common DC power bus to the HESS 6 on B unit 2. Doing this would access all 8 traction motors that can be fully utilized to perform regenerative braking. This allows the train to slow down significantly faster at high speeds than a train just using the 4 traction motors installed in B unit 2.

The second portion of the detailed description relates to a hybrid control interface box (HCIB). Previously discussed has been the B unit 2 that houses the HESS 6 and A unit 2 that has HCIB 14 installed. The HCIB 14 interprets the engineers throttle commands for acceleration and cruising and blends power from both the diesel engine in A unit 2 and the HESS 6 to produce the requested power. When the engineer manipulates the controls to decelerate the train, the HCIB 14 will have to blend the standard passenger train dynamic braking system with the B unit 2 power electronics 8. When the HESS 6 is not full of stored energy, the B unit 2 power electronics 8 will use the B unit 2 traction motors as generators and decelerate the train by transferring electric energy into the hybrid storage system.

In early embodiments the HCIB 14 unit will be added to the standard locomotive acting as the A unit. In future embodiments, the functionality of HCIB 14 could be incorporated into the locomotive control system which would eliminate the need for a separate HCIB 14. The HCIB 14 would intercept and manipulate the locomotive throttle signals in a manner similar to an LFO (see definitions). In addition to the LFO throttle intercept concept, this system will also intercept and manipulate the dynamic braking control signals. In the instances where there are more than 2 HCIB 14's because there is a second locomotive in the consist, then the HCIB 14 system will have to use the combined power of the two locomotives in its calculations to balance the power output of the two locomotives and the B unit 2.

In its simplest form the HCIB 14 could intercept and manipulate the throttle signal and the dynamic brake handle signal. With the current APTA standard RP-E-014-99 for passenger locomotive blended brake control, standard practice is to use the automatic braking handle for decelerating the train. Under blended brake guidelines, whenever the automatic brake handle is moved to give at least 5 psi of brake control pressure, the blended brake controller automatically mixes dynamic and air braking with an emphasis on using the as much dynamic braking force as possible. Also part of the standard is that any motion of the dynamic brake handle takes the controller out of blended braking and at that point the automatic brake handle simply controls the air brakes of the train as if the blended brake system did not exist or was turned off.

Now that blended braking has been deactivated the engineer can control the rate of deceleration with the dynamic brake handle. Dynamic brake systems with DC traction motors stop functioning below approximately 10 mph. With the automatic brake handle already at the 5 psi setting, the engineer can start applying the automatic train brakes at speeds below 10 mph as he moves the dynamic brake handle back to the off position and the train smoothly comes to a complete stop using the air brakes.

This described control scheme allows the standard passenger locomotive braking control system to remain completely unchanged so normal inputs operate the locomotive per the APTA standard. By using the dynamic brake lever activated cutout specified in the blended brake standard we could integrate a hybrid control scheme on top of the conventional blended brake standard. To utilize the hybrid system the train engineer only needs to set the automatic brakes to 5 or 10 psi as normally done, and then start applying the dynamic brake handle instead of adding more automatic brake pressure. The system will automatically turn over the dynamic brake control from the blended brake controller to the dynamic brake handle. Because the HCIB 14 intercepts the dynamic brake handle signals it can now manipulate both the passenger locomotives dynamic braking system and the hybrid B units power electronics to charge up the hybrid energy storage system as it decelerates the train. If for any reason the engineer feels the need to use the standard train air brakes, they are already preloaded and he only needs to increase the pressure by further applying the automatic brake lever.

Not only is the proven and safe standard blended braking system retained as is, the engineer does not need significant training or practice to operate a hybridized train with this system. If an event occurs and the engineer responds to standard operating practices, the automatic brake handle stops the train just as it would in a standard locomotive system.

After these systems have been in development it is likely that the APTA standard will get revised and a hybrid control element would get incorporated into it. At that time a separate HCIB 14 won't be needed and its functionality will be incorporated into the locomotive control system. In the meantime this overlaid hybrid control scheme can be implemented without modifying the existing hardware.

The third portion of the detailed description relates to hybrid passenger locomotive control functionality. With the incorporation of an ultra-capacitor based energy storage system, the amount of power available to accelerate and decelerate the passenger train is significantly more than the rated power of the diesel engine.

The power limit now is not the propulsion engine, but the power capacity of the traction motors. Typical DC traction motors are current limited and are rated for a nominal power at a low speed. 10 or 15 mph in some cases, and in the past this was all the information that was needed as the fraction motors has to be able to accept the full rated power of the diesel engine at this low speed as heavy trains ascending long grades would need to operate at these low speeds.

As a DC traction motors speed increases its operating voltage increases. An electric motors power capacity is limited by how much internally generated heat that it can withstand. The internal heat generated by an electric motor is more a function of the current flowing through it than the voltage applied to it. At 10 mph where a traction motor may be rated at 380 kW, it may be operating at 400 volts DC and its maximum current of 1050 amps. At 79 mph that same traction motor is operating at 1300 volts and now has a much lower current around 300 amps which is still around 400 kW of power. But the electric motor is still limited by current to 1050 amps. The motor that is rated for only 400 kW at 15 mph, may theoretically be capable of 1458 kW at 79 mph. Lightly modified locomotive traction motors are commonly used in other applications at constant higher RPM at over 1000 hp continuous.

With this in mind a modified scheme should be developed for operating hybrid passenger locomotives that allows this increased power capability at higher speeds to be utilized. One way to do this is with a secondary input, possibly a momentary button or a pedal. This could be the 'boost' switch. When boost switch is active and the throttle is at notch 8, the hybrid control system should increase the combined power output of the engine and hybrid energy storage system to maintain a preprogrammed acceleration rate. This rate would be a safe rate that would not unsettle passengers. The hybrid control system would maintain this acceleration rate until the train had accelerated fast enough that the programmed acceleration rate required more energy than is safe to put through the traction motors or is available from the engine and HESS combined. Whenever the engineer releases the boost switch or pedal the notch 8 power output would go back to standard rated notch 8 power.

Instead of a separate boost input, the control system could be designed to do this automatically in notch 8. Meaning that notches 1 thru 7 would be calibrated to the nominal notch settings for the rated locomotive power, and that notch 8 would put out at least the typical rated notch 8 power, but if the acceleration rate was less than the programmed rate, the hybrid control system would start to increase the power available, similar to how the boost input would work.

Deceleration is the same way, in the preliminary control scheme before the APTA comes up with a revised standard to accommodate hybridization; it is proposed to operate the hybrid system under deceleration using the dynamic brake handle. As before the dynamic brake handle can be calibrated to the rated power of the locomotive with a boost input used by the engineer to indicate that the system should attempt to slow down at the programmed deceleration rate. At first the acceleration rate will be limited by the traction motors ability to absorb the regenerative energy, but as the train speed drops, the hybrid control system will start reducing the braking force to maintain this rated acceleration. Again if the engineer releases the input or moves the dynamic brake handle from full dynamic braking, the system will return to the rated power absorption for that dynamic brake handle position.

As in acceleration it may be decided that this acceleration control rate can be engaged without and additional control input, and would automatically be engaged when the dynamic brake handle was in the full dynamic brake position.

Another way to have the engineer control when the train is in acceleration rate control is to combine both previous systems. The throttle lever could have the standard 8 notches and then a momentary notch 9 that is spring loaded to push back into notch 8 when the engineer releases the lever. Or notch 9 could not be momentary, but an additional notch where the throttle will remain when placed there.

The same idea can be used for the dynamic brake control, with the dynamic brake handle having a spring loaded position just past the full dynamic brake control. If the engineer wants rate controlled braking he will advance the dynamic brake control to full dynamic braking and then move it past that position against a spring. With the handle pushed against this spring, the hybrid control system will be in acceleration rate control, once the pressure on the handle is released, the handle will move back to standard dynamic brake control.

The fourth portion of the detailed description relates to deceleration rate control. In another embodiment, when implementing a hybrid control interface box for passenger service it is proposed to convert the dynamic brake lever from a lever that controls braking power to a lever that controls deceleration rate. While this seems like a significant control system change, this would make the dynamic brake control behavior more like that of the locomotive the air brake system.

In a combined throttle and dynamic braking lever system as used in modern passenger locomotives, there are typically 8 detented notches of throttle power with the position closest to the engineer being notch 8 or full power, when the lever is pushed forward, it will travel thru 7 detents to notch 1 (approximately 5% power) and then the next detent forward puts it into idle. From here the lever can be moved to the right to put the dynamic brakes into setup mode. From this position the lever is moved forward to apply the dynamic brakes. The further forward the lever is moved the more dynamic braking force is applied until the lever is all the way forward away from the engineer against the lever stop of full dynamic braking. It is proposed that instead of forward motion for the dynamic brake lever proportionally controlling the amount of dynamic brake power, instead forward motion of the dynamic brake lever could set a certain deceleration rate. With the lever all the way forward representing full service braking rate, and the deceleration rate decreasing linearly to 0 as the dynamic lever it brought back to the setup/idle position.

In one embodiment the dynamic brake lever can be given 8 detent positions similar to the throttle lever. Each of these notches represent an increasing deceleration rate starting from the setup with no deceleration and increasing to full service stop braking at notch 8 of dynamic braking.

If all the dynamic brake lever travel is used to set increasing fixed deceleration rate settings, the engineer may lose one feature of dynamic braking which is the ability to apply just enough dynamic braking to maintain constant speed such as when going down a grade.

An optional configuration of the rate control concept of dynamic braking is to make the setup position not a position where the dynamic brakes are not applied, but a setting where the rate of deceleration is zero. In this case the dynamic brake system will apply just the amount of dynamic braking needed to maintain speed. It will do this until the amount of dynamic braking needed is more than the dynamic brake system can absorb, at which point it would stay at its maximum dynamic brake capability and the train will no longer be able to maintain a constant speed. At this point the train engineer would need to use additional train air brakes. This behavior is similar to conventional power based dynamic brakes.

The fifth portion of the detailed description relates to hybrid switcher locomotive control functionality. If using a hybrid storage system that is ultra-capacitor based on a switcher locomotive, it can be done with no added controls needed for the engineer. When the engineer asks for power the control system will attempt to use the power in the hybrid storage system first so that the engine operates less often and also so that there is room in the hybrid energy storage system to put the regenerative energy back into when the engineer applies the dynamic brakes. This works fine when most activity is a short pull up to low speeds.

This system assumes that the switcher is rated for a higher power level than the engine or engines will put out. For example, notch 8 on the throttle control is rated for 2000 hp but the engine in the locomotive is only 1200 hp. As long as there is still energy in the hybrid storage system, in notch 8 the available power will be 2000 hp. After the hybrid energy storage system has been depleted the locomotive will only put out 1200 hp in notch 8 which is closer to the amount of power the locomotive would put out in notch 6.

If the engineer knows that this will be a longer pull of a heavier than usual train or up to higher speeds, he may want to use the engine at first so as to keep the energy in the hybrid storage system to allow for more power later. In this case it would be desirable to have an additional engineer control input to indicate that the energy should be left in the hybrid storage system as long as possible.

This is an optional feature and will be referred to as the 'engine bias input' and could be a momentary button or a pedal. When active it will force the system to insure that the HESS was full by starting the engine as soon as the engineer moves the throttle out of idle, at first the engine would be moving the train in the lower notches and charging the HESS until the engineer has advanced the throttle far enough that engine can no longer can provide the engineer requested tractive effort. At this point the engine is at max power and the hybrid system will make up the difference. There may be times where the pull will not be long enough to fully drain the HESS, in situations such as these, the engineer could release the 'engine bias input' control and return the system back to normal so that the system used as much power from the HESS. This optional additional control does not need to be used and will not effect normal operations if it is not used or used ineffectively. What this additional control does is allow a skilled engineer with some experience the flexibility to optimize the balance of engine and HESS power depending on how many cars are being pulled and how far.

As an added tool for the engineer to know when to activate the extra control, it would be beneficial to have a visible indicator of some sort that allowed the engineer to quickly gage how much energy storage is in the system. Over time this would give the engineer a feel for when the hybrid energy storage system would run out of energy and he should have used the engine bias input.

The sixth portion of the detailed description relates to a modular locomotive ultra capacitor storage system. FIG. 2A is an isometric view of a HESS 6 system. This system has five cabinet sections on each side of the locomotive with 3 vertical columns of UC Modules 22 in each cabinet section. Each cabinet section holds 3 columns of UC modules 22 for a total of 39 UC modules 22 per cabinet section and 390 UC modules 22 in this pictured installation. Each UC module 22 can contain up to 78 individual UC cells for a total of 30,420 UC cells in the HESS. If the UC cells are allowed to operate from 3.0 volts down to 1.0 volts, each cell is good for 3.33 Watt-hours for a system total of 100 kW-hrs. This size HESS 6 would absorb the stopping energy of a medium sized passenger train with 8 or 9 passenger cars stopping from 79 mph.

Above the rack sections is the horizontal duct 24, in this embodiment this single horizontal duct 24 supplies cooling air to all of the HESS 6 cabinet sections. Each vertical column of UC modules 22 has its own vertical duct 26 that distributes cooling air to the individual US modules 22 in the column. Vertical duct 26 is fed cooling air from horizontal duct 24.

FIG. 2B is a close up view showing some construction detail of the cabinet sections in HESS 6 with multiple pieces removed for clarity. Now visible is the pair of bus bars 32 behind each column of UC modules 22. This configuration of the UC storage system has 3 columns of UC modules 22 connected in series. This requires two intermediate bus bar jumpers 34 to connect neighboring pairs of bus bars as intermediate bus bars where all the UC modules 22 in one column are in parallel, but three columns are in series allowing 234 UC cells to be connected in series for a peak HESS system voltage of 701 volts DC. This voltage would be measured across the outer most bus bars 32 of the three UC module 22 columns in each cabinet section. In each cabinet section, the columns of UC modules 22 are separated from each other by a sheet steel wall 38 with UC module rack slides 36 holding up each UC module 22. In this embodiment the sheet steel walls are actually two sheets separated by rack side sheet stiffeners which give added rigidity with lighter and thinner sheets. This wall could have single or double sheets and may or may not need the stiffener depending on the design. The UC module 22 is installed by sliding it into the rack section on top of the UC module rack slides 36. In the last few inches of its travel it engages the UC module electrical contacts 30 mounted to the bus bar. The UC module 22 slides in until it is stopped by the front face plate 48 contacting the edge of the sheet steel sidewall 38. At that point two UC module retention bolts are threaded through front face plate 48 into mounting boss 40 to hold the module in place.

Visible in the figure are the UC module air supply ports 28 on the vertical duct 26.

The bus bars are surrounded by optional plastic isolators 33 to protect them from conductive debris falling on them and shorting out to the wall. The plastic isolators 33 can also help prevent the high voltage from arching to ground when moisture and or water may be present.

In this embodiment, there are three columns of UC modules 22 in series from one rack section. In practice it could be any number of UC module 22 columns in series and they can be from more than one cabinet section.

FIG. 3A is a top view and FIG. 3B is a cross section side view of UC Module 22. The UC Module has a UC Module lid 41 and a UC module main housing 44 that contain the UC cells 61. At the left end of the UC module is an air supply gasket 43 that forms a seal between the UC Module main housing 44 and the vertical duct 26 from FIG. 1A and FIG. 2. Also at this end are two protruding sections 42 of the UC module main housing that provide high voltage isolation for where UC module 22 engages with contact 30. The UC Module electrical contacts 30 from FIG. 2B will slide into these protruding sections 42 and they will then be electrically isolated from most debris that can end up in the rack cabinet areas.

FIG. 3C is a left and FIG. 3D is a right end close up cross section of FIG. 3B. On the left end is the gasket 43 and the cooling air inlet 45. This is where the cooling air enters the UC module from the UC Module air supply port 28 on the vertical duct 26. Once the air enters the module it flows up into the cooling air plenum 49. The cooling air plenum 49 is a cavity formed between the UC module lid 41 and the UC module main housing 44. The only way for cooling air to leave this cavity is to pass around the outer surface of a UC cell 61. An optional UC cell cooling sleeve 60 will form a small passage way around the UC cell 61, by adding this UC cell cooling sleeve 60 it should be possible to control the cavity size around the UC cells 61 more precisely or allow the UC module main housing 44 to also hold different size UC cells 61, possibly battery cells instead of UC cells 61 in future mixed ultra capacitor and battery systems.

The benefit of a more precise cooling air passage around the UC cell 61 is that it can be smaller which will reduce the amount of air that needs to be ducted to each UC module 22. With 390 or more UC modules 22, reducing the volume of airflow needed is important. Because the UC module main housing 44 has to structurally support the weight of the UC module it should be made of a rigid material. The independent UC cell cooling sleeves 60 construction allows the UC cell cooling sleeves to be made of a more pliable material than the housing which also reduces the accuracy demands and therefore cost on the diameter of UC cell 61 during manufacture.

The UC module lid 41 is bolted down and seals to the UC module main housing 44. The UC module lid has cast in plastic UC cell hold down bosses 46 that hold the UC cells 61 in place. This keeps the UC cells 61 from moving up and down.

On the right side of the UC module is the front retaining panel 48. In this embodiment it is a low cost stamped metal plate that bolts to the UC module main housing 44. Behind the front retaining panel is a serviceable cavity 47 for control electronics. In this area could be the control electronics for the UC module 22. This area is serviceable without removing the module from the rack section by unbolting the front retaining panel 48 from the UC module 22 main housing 44. The front retaining panel 48 is also where a connector plug could be installed that brings in low voltage power and communicates with the overall control system for all of the UC modules 22 in the HESS 6 system. This low voltage and communications plug could also be designed to plug in on the left side of the module 22; it would be connected automatically when the UC module 22 is slid into the rack section of HESS 6. Also in the left side is a cavity 50 for an optional DC contactor that will disconnect this UC module 22 from one or both bus bars 32 if the UC module 22 internal control system decides this is needed. This could be because of a bad cell or a fault in the UC module controller. In most instances the UC module controller will be connected to each electrical connecting strap between all of the UC cells 61. This will allow the UC module controller to monitor the cells for health and also to balance the UC cells.

The seventh portion of the detailed description relates to spiral cooling sleeves. The previously described cooling air passages around the UC cells do have one challenge. With 30,000 cells in an UC storage system, and a desire to give each cell its own air supply, all of these independent air passages will add up to a very large total area requiring not only a lot of air flow, but large supply ducts.

If the duct system proves to be restrictive it will be difficult to insure the pressure supply to each UC module 22 will be the same and that can cause some UC cells 61 to not get as much cooling air. If some UC cells 61 operate warmer they will fail at a faster rate, and it's possible the system will have to operate at a lower peak UC cell 61 voltage which will reduce the amount of energy storage per UC cell 61. The amount of energy storage in a UC cell 61 is a function of the square of the voltage. If the operating voltage of the UC cells 61 is reduced 10% from 3.0 volts to 2.7 volts, the energy capacity per UC cell 61 drops 21%.

One simple solution to the cooling air flow management challenge is to create spiral shaped air channels around the UC cells 61. These would appear similar to threads in a nut. Compared to a traditional annular radial gap with the air flowing in an axial direction along the length of the UC cell 61 cylindrical case, this spiral shape could reduce the cross section cooling flow area around each cell by a factor of 10. It would also lengthen the air flow passage by a similar factor. The combination of a smaller cross section and a longer passage can increase the pressure drop across the airflow passage by an order of magnitude. This higher pressure drop across the UC cell 61 passage insures that most of the total system pressure differential from the supply fan is consumed across the UC cell 61 and not in the ducting system. This significantly decreases the effects of pressure loss in the ducting system and reduces the variation of air flow around the individual UC cells 61 throughout the 100 or more UC cell module 22 assemblies in a locomotive.

Another effect is that each increment of cooling air as it passes through the channel around a single UC cell will have more time to extract heat from the cell. This allows less total air mass to capture more heat. This reduced air mass requirement combined with a reduced sensitivity to supply duct pressure loss significantly reduces the required size of the air supply ducting. This reduced ducting requirement allows packaging more UC cells in the same volume, at the same time it allows UC cell 61 operation at a higher peak voltage and corresponding energy density.

The spiral groove could be molded into the pocket of a UC module main housing 44, or it could be incorporated into a spiral sleeve. This spiral sleeve could be designed in such a way that it replaces the typical plastic coating on the UC cell. The outer metal case on a typical UC cell 61 is connected directly to one of the electrodes which will be conducting heat away from the inside of the UC cell.

The benefit of incorporating the spiral groove into the housing pocket for the UC cells 61 is less parts to manufacture and possibly tighter packaging. The downside is expensive tooling to incorporate the spiral groove and the tighter tolerance the UC cells may have to be manufactured with in order for the spiral groove to function properly. The tooling would also be expensive to modify if the UC cell size changes.

Incorporating the spiral groove into a sleeve allows a more flexible material to be used that will accommodate less manufacturing precision on the UC cell outside diameter. The cost of tooling for making the spiral sleeve is much less so the same UC module main housing could accommodate different size UC cells with only the tooling for the spiral sleeve having to change.

Figure 4C:
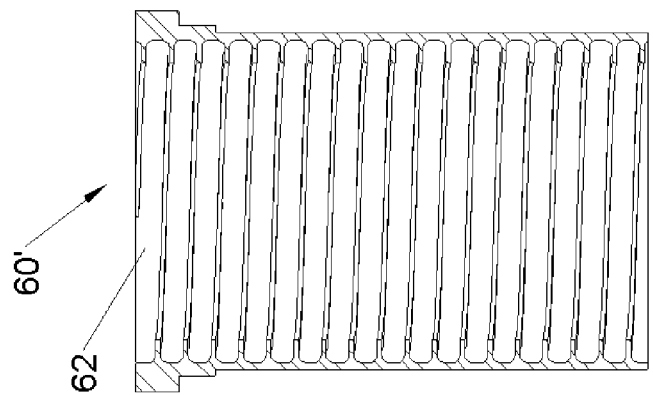
FIG. 4C: Cross section view of a UC cell air cooling sleeve further illustrating the spiral shaped cooling air passage
Figure 4B:
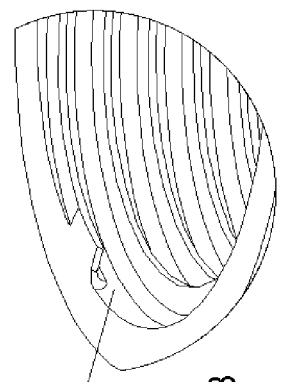
FIG. 4B: Detail View B from FIG. 4B illustrating the inlet area to the spiral shaped cooling air passage
Figure 4A:
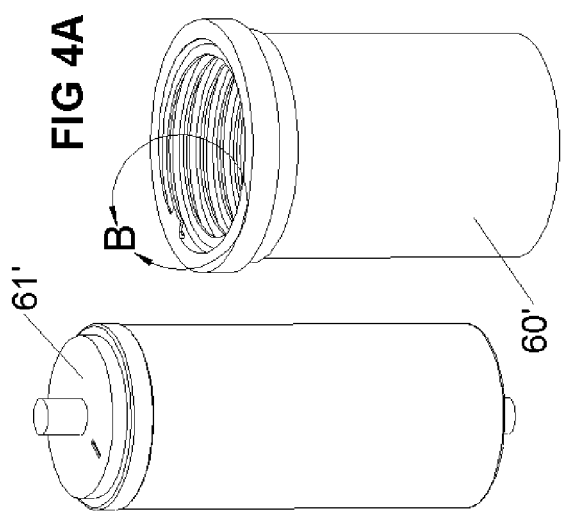
FIG. 4A: An isometric view of a typical UC cell and a UC air cell cooling sleeve with a spiral shaped cooling air passage.

FIG. 4A is an illustration of a spiral sleeve 60' and a UC Cell 61'. The UC cell 61' would slide into the spiral sleeve 60' for installation into the UC Module housing 22. Pressurized air would enter into the spiral groove 62 at the top of the spiral sleeve 60' and the UC cell 61' and wind its way through the spiral groove 62 until it reached the bottom of the spiral sleeve 60' and UC cell 61'. At this point it will have accumulated some heat from the UC cell 61' outer surface and will exit out the bottom of the spiral sleeve 60'.

The eight portion of the detailed description relates to a thermally fused ultra capacitor strap connector. The most serious safety concern with UC or battery cell storage systems is fire propagation from one cell to the others within the same module thus causing the 70 plus cells in that module to start burning together. If all the cells in a module were burning at the same time, it could release enough heat to ignite neighboring modules beyond the steel barriers.

Each end of a UC cell in the UC module will be connected to one terminal of another UC cell. The exception to this is the first and last cell in the string which is connected to a power terminal for the UC Module.

These connections are typically made with a conductive strap of metal. They can be soldered in place, connected with fasteners or held down with springs.

The thermally fused UC cell connectors would be designed to disconnect a hotter UC cell from its series connected cells. With bismuth solder alloys available that melt at temperatures down to 140 C, it is possible to have a passive disconnect system that will disconnect any cell that rises above a specified design temperature. This feature alone is a significant step towards passive fire prevention. This is accomplished by soldering a curved strap as a connection for the two cells. When soldered to the cells, the strap would be forced into a flatter configuration and if either cell heated up past the solder melting temperature, the solder at that end of the strap would melt and that end of the strap would move away from the UC cell contact breaking both the current path and the heat flow path. All good electric current conductors are also good heat conductors and this thermal fuse not only stops current flow, but is also a fire propagation mitigation device in that it thermally disconnects the two cells.

This would only need to be done to half of the connectors, either the top connecters or the bottom.

Another method of doing this without using a spring feature would be with a 3 piece connector soldered together. This would be structured in such a way that when the temperature of the connector got to a designed peak temperature, the solder would melt and one of the pieces would move either due to gravity or some other force, said movement breaking the conductor path and preventing further heat built up and ignition.

Also the connections for the spring bars or the 3 piece connector need not be solder, they could be some other temperature sensitive bonding method that will fail at the appropriate temperature.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A modular locomotive ultra capacitor (UC) or battery storage system comprising:
    at least one cabinet section in a locomotive;
    a plurality of vertical stacks of UC or battery modules housed within each cabinet section, each UC or battery module including a plurality of UC or battery cells, respectively;
    wherein each UC or battery module within each of the vertical stacks of UC or battery modules is electrically connected in parallel to the UC or battery modules within the vertical stack;
    wherein each of the vertical stacks of UC or battery modules are connected in series with the other vertical stacks of UC or battery modules within each cabinet section;
    wherein the connections between the UC or battery modules and between the vertical stacks of UC or battery modules are made by bus bars located such that the UC or battery modules electrically connect with the bus bars in a combination of series and parallel connections when the UC or battery modules are located in position within the cabinet sections; and
    a cooling air system including a plurality of vertical ducts connected to a horizontal duct and a forced air supply, wherein each vertical stack of UC or battery modules has a corresponding one of said vertical ducts that distributes cooling air to each UC or battery module within the corresponding vertical stack, and an air groove provided in a module main housing, around, or between the UC or battery cells.

2. The modular locomotive ultra capacitor (UC) or battery storage system of claim 1, wherein each UC or battery module includes an air supply gasket, and wherein each vertical duct includes an air supply port that aligns with the air supply gasket of the respective UC or battery module.

3. The modular locomotive ultra capacitor (UC) or battery storage system of claim 1, wherein each UC or battery module includes a disconnect.

4. The modular locomotive ultra capacitor (UC) or battery storage system of claim 3, wherein at least one disconnect is actuated by heat.

5. The modular locomotive ultra capacitor (UC) or battery storage system of claim 1, wherein each UC or battery module includes a cavity adjacent the bus bar, and wherein a DC contactor capable of disconnecting the UC or battery module from the respective bus bar is positioned within the cavity of each UC or battery module.

6. The modular locomotive ultra capacitor (UC) or battery storage system of claim 1, wherein each cabinet section includes three vertical stacks of UC or battery modules.

7. The modular locomotive ultra capacitor (UC) or battery storage system of claim 1, further comprising a plurality of cabinet sections.

8. The modular locomotive ultra capacitor (UC) or battery storage system of claim 1, wherein each UC or battery module includes a UC or battery module lid disposed on a UC or battery module main housing.

9. The modular locomotive ultra capacitor (UC) or battery storage system of claim 8, wherein the UC or battery module main housing comprises said groove in the form of a spiral groove adjacent the UC or battery cells.

10. The modular locomotive ultra capacitor (UC) or battery storage system of claim 1, wherein each UC or battery module includes a retaining panel on an end opposite the bus bar, and wherein control electronics are disposed within a cavity behind the retaining panel of each UC or battery module.

11. The modular locomotive ultra capacitor (UC) or battery storage system of claim 1, wherein at least one cell includes a UC or battery cell cooling sleeve.

12. The modular locomotive ultra capacitor (UC) or battery storage system of claim 1, further comprising a steel sheet wall positioned between adjacent vertical stacks of UC or battery modules.

13. The modular locomotive ultra capacitor (UC) or battery storage system of claim 1, wherein the system stores more than 45 kW-hrs.

14. The modular locomotive ultra capacitor (UC) or battery storage system of claim 1, wherein the modular locomotive UC storage system is connected to a hybrid control interface box.

15. The modular locomotive ultra capacitor (UC) or battery storage system of claim 14, wherein the hybrid control interface box receives throttle information and blends power from a diesel engine and the modular locomotive UC storage system.

16. The modular locomotive ultra capacitor (UC) or battery storage system of claim 15, wherein the hybrid control interface box receives throttle and dynamic brake control inputs and calculates new throttle and dynamic brake control settings.

17. The modular locomotive ultra capacitor (UC) or battery storage system of claim 1, wherein the cooling air system includes a single forced air supply.

18. The modular locomotive ultra capacitor (UC) or battery storage system of claim 1, wherein the air cooling system has a total system pressure differential between a first air pressure produced by the forced air supply and a second air pressure of air emitted from the air cooling system, and wherein a majority of the total system pressure differential is consumed in the UC or battery cells.

19. The modular locomotive ultra capacitor (UC) or battery storage system of claim 18, the total system pressure differential includes a differential over the air groove and a differential over the vertical and horizontal ducts, and wherein the differential over the air groove is an order of magnitude greater than the differential over the vertical and horizontal ducts.

20. The modular locomotive ultra capacitor (UC) or battery storage system of claim 1, wherein the air groove is located within an annular radial gap of the UC or battery cell, wherein the air groove has an effective length longer than an effective length of an annular radial gap of the UC or battery cell configured identically to the annular radial gap of the UC or battery cell of claim 1 except not including the air groove.

21. The modular locomotive ultra capacitor (UC) or battery storage system of claim 1, wherein each UC or battery module includes electrical contacts that disengage when the module disconnects from the bus bars.

* * * * *